(12) United States Patent
Hagen et al.

(10) Patent No.: US 7,644,534 B2
(45) Date of Patent: Jan. 12, 2010

(54) PLANER BOARD

(76) Inventors: Kevin H. Hagen, 824 W. 15th Ave., Mitchell, SD (US) 57301; Gregg Girard, 501 Oakmond Ave., Mitchell, SD (US) 57301

( * ) Notice: Subject to any disclaimer, the term of this patent is extended or adjusted under 35 U.S.C. 154(b) by 270 days.

(21) Appl. No.: 11/818,276

(22) Filed: Jun. 14, 2007

(65) Prior Publication Data
US 2008/0307692 A1 Dec. 18, 2008

(51) Int. Cl.
*A01K 91/08* (2006.01)

(52) U.S. Cl. .................................... 43/43.13

(58) Field of Classification Search .............. 43/43.13
See application file for complete search history.

(56) References Cited

U.S. PATENT DOCUMENTS

| | | | | |
|---|---|---|---|---|
| 2,572,427 A * | 10/1951 | Anglim | ............... | 43/43.13 |
| 2,901,857 A * | 9/1959 | Lockert | ............... | 43/43.13 |
| 3,067,539 A * | 12/1962 | Black | ............... | 43/43.13 |
| 3,099,099 A * | 7/1963 | Cahen et al. | ............... | 43/43.13 |
| 3,401,483 A * | 9/1968 | Bellah et al. | ............... | 43/43.13 |
| 3,507,068 A * | 4/1970 | Roberts | ............... | 43/43.13 |
| 3,748,775 A * | 7/1973 | Wagner | ............... | 43/43.13 |
| 3,818,624 A * | 6/1974 | Duffy | ............... | 43/43.13 |
| 3,943,653 A * | 3/1976 | Reckler | ............... | 43/43.13 |
| 3,949,512 A * | 4/1976 | Stegemeyer | ............... | 43/43.13 |
| 3,973,347 A * | 8/1976 | Kearney | ............... | 43/43.13 |
| 4,028,840 A * | 6/1977 | Wille | ............... | 43/43.13 |
| 4,254,573 A * | 3/1981 | Mastropaolo | ............... | 43/43.13 |
| 4,524,538 A * | 6/1985 | Halvorsen | ............... | 43/43.13 |
| 4,691,466 A * | 9/1987 | Lamb | ............... | 43/43.13 |
| 4,698,933 A * | 10/1987 | Shaw | ............... | 43/43.12 |
| 4,702,033 A * | 10/1987 | Shaw | ............... | 43/43.12 |
| 4,825,583 A * | 5/1989 | Kammeraad | ............... | 43/43.12 |
| 4,831,769 A * | 5/1989 | Skille | ............... | 43/43.13 |
| 4,920,689 A * | 5/1990 | Anderson | ............... | 43/43.13 |
| 5,163,246 A * | 11/1992 | Shaw | ............... | 43/43.12 |
| 5,341,591 A * | 8/1994 | Hicks | ............... | 43/43.13 |
| 5,548,919 A * | 8/1996 | Hicks | ............... | 43/43.13 |
| 5,615,513 A * | 4/1997 | Luna | ............... | 43/43.13 |
| 5,636,467 A * | 6/1997 | Adams | ............... | 43/43.13 |
| 5,784,826 A * | 7/1998 | Walker | ............... | 43/43.12 |
| 5,826,365 A * | 10/1998 | Stroobants | ............... | 43/43.12 |
| 5,867,932 A * | 2/1999 | Reiger | ............... | 43/43.13 |
| 5,867,933 A * | 2/1999 | Walker | ............... | 43/43.13 |
| 5,875,583 A * | 3/1999 | Church | ............... | 43/43.13 |
| 5,950,349 A * | 9/1999 | Walker | ............... | 43/43.12 |
| 5,979,104 A * | 11/1999 | Walker | ............... | 43/43.12 |
| 6,000,167 A * | 12/1999 | Bowman | ............... | 43/43.13 |
| 6,119,389 A * | 9/2000 | Walker | ............... | 43/43.13 |
| 6,243,983 B1* | 6/2001 | Walker | ............... | 43/43.13 |
| 6,256,924 B1* | 7/2001 | Walker | ............... | 43/43.13 |
| 6,412,215 B1* | 7/2002 | Even | ............... | 43/43.13 |
| 6,789,350 B1* | 9/2004 | Link | ............... | 43/43.13 |
| 7,337,578 B2* | 3/2008 | Pieczynski | ............... | 43/43.13 |
| 2007/0193107 A1* | 8/2007 | Garrett | ............... | 43/43.13 |

\* cited by examiner

*Primary Examiner*—Darren W Ark

(57) ABSTRACT

The present invention relates to a planer board of novel and non-obvious construction methods and materials resulting in reduced weight. The planer board also quick release guidance device that is easier to use than prior art devices.

15 Claims, 10 Drawing Sheets

PLANER BOARD

BACKGROUND OF THE INVENTION

Planer boards are devices used in sport fishing to allow the trolling of multiple fishing lines from a boat. Planer boards are pushed out from the boat as the boat travels through the water. Several can be used on either side of the boat and, since they can be let out at different distances from the boat and along the sides of the boat, they prevent fishing lines from becoming tangled with each other.

In their simplest form, planer boards are flat rectangular boards that float vertically near the surface of the water. The fishing line is attached to the planer board so that the planer board trolls generally parallel to the direction that the boat is travelling. Planer boards can be set 50 yards or more from the boat allowing the user to fish large expanses of water at once.

Generally, a fishing line attaches to the planer board at two positions. The first position is typically grips the line in some manner so that the line does not slip and allow the planer board to slide freely on the line. The device at the first position is typically referred to as a gripping device, or similar. The second position is typically at the back end of the board and does not grip the line in any way. Rather, the device at the end of the planer board guides the line such that it trails the planer board and prevents it from meandering to the side and possibly getting tangled on other lines. The device that guides the line is typically referred to as a guidance device, or similar.

Prior art planer boards have numerous problems. First, the prior art planer boards are relatively heavy. Because of the heaviness of these planer boards, it is difficult for users to see strikes by smaller fish. This is particularly important since planer boards can be at a distance of 50 yards or more from the boat. Since weights are often used on the bottom edge of the planer board, the heavier the planer board itself, the heavier the weights must be to keep the board properly oriented in the water. Making the planer board smaller is not a suitable method for overcoming this problem since a smaller board would not track as well in the boat's wake and would be more difficult for the user to see. Thus, prior art planer boards have been advanced as far as technically possible to balance the competing requirements of size and weight.

Second, when reeling in the planer board after hooking a fish it is important for the user to be able to quickly remove the line from the planer board to be able to continue reeling in the fish. Unfortunately, prior art planer boards do not allow for the fastest removal of the board from the fishing line potentially costing the user their fish. Other prior art planer boards have complicated mechanisms that are expensive to manufacture.

For example, U.S. Pat. No. 5,875,583 to Church (issued Mar. 2, 1999) discloses a planer board made of molded high-density plastic. The boards disclosed in this publication use a screw-type gripping device to hold the fishing line. Such screw type gripping devices slow down the user when removing the fishing line form the planer board. Additionally, the guidance device on this board utilizes a complicated post mechanism that requires carving out sections of the board. Because of this design, this type of guidance device is expensive to manufacture.

U.S. Pat. No. 6,789,350 to Link (issued Sep. 14, 2004) discloses a planer board with in built in lighting system. This lighting system of this planer board is intended to help the user see the planer board in the dark. Although the Inventor describes his planer board as light weight, because of the electronics, batteries, bulbs and other components necessary for the lighting system to work, these boards are heavier when compared to planer boards not having these components.

U.S. Pat. No. 6,000,167 to Bowman (issued Dec. 14, 1999) discloses a planer board of a different design wherein the fishing line is attached to the tether line holding the planer board to the boat. In other words, the fishing line attached to the tether line between the boat and the planer board. This board does not have a guidance device and, thus, the fishing lines may be susceptible to tangling. Thus, this design requires that fewer lines be used per boat or that the line be spaced greater distances form each other.

Therefore, what is needed is a planer board that weighs less than prior art planer boards without giving up size. What is also needed is a planer board that is easier to remove from the fishing line when reeling in a fish.

SUMMARY OF INVENTION

In one aspect, the invention relates to a planer board that is lighter than prior art planer boards of the same size and has novel quick release mechanisms for easy and expeditious removal of the fishing line.

The Inventors of the present invention have realized that expanded polystyrene beads can be used to make a hardened, water impervious encasement that can be used successfully in a process to construct a superior planer board. In this regard, the planer board of the present invention comprises a lightweight wooden core encased in a hard, water impervious shell. Although the present invention is not limited to any particular type of wood, light woods are preferred and balsa wood is most preferred.

Balsa (*Ochroma pyramidale*, synonym *O. lagopus*) is a large, fast-growing tree that can grow up to 30 meters (about 100 feet) tall, native to tropical South America north to southern Mexico. It is evergreen, or dry-season deciduous if the dry season is long, with large (30-50 cm) weakly palmately lobed leaves. The name balsa derives from Spanish for a raft. The timber is very soft and light with a coarse open grain. The density of dry balsa wood ranges from 100-200 kg/m$^3$, with a typical density of about 140 kg/m$^3$ (about one-third the density of other kinds of hard wood). Because of the lightness of balsa wood, balsa wood is the preferred wood used in the core of the planer board of the present invention.

Other planer boards, to the best of the Inventor's knowledge, have not used balsa wood in the construction of planer boards because it is easily damaged, can become water logged and does not hold screws or other attachment devices well. The present invention solves these problems with using balsa wood for a planer board by encasing the balsa wood in a plastic shell. The present invention is not limited by the nature or selection of plastic used for encasing the balsa wood of the present invention. However, the preferred plastic is polystyrene.

In the early 1900s, Dow invented a process for extruding polystyrene to achieve a closed cell foam that resists moisture. In recognition of its superior insulating properties, buoyancy and "unsinkability," it was originally adopted in 1942 by the Coast Guard for use in a six-man life raft. Styrofoam can be used for building materials (including insulated sheathing and housewrap), pipe insulation and floral and craft products. The word styrofoam, a trademark of the Dow Chemical Company, is often used by the general public in the United States as a generic term to indicate any brand of polystyrene foam. Coffee cups, cooler or packaging material that are typically white in color and are made of expandable polystyrene beads.

The wood core of the planer board of the present invention is encased in polystyrene by, for example, the following method. The balsa wood core is placed in a mold that is larger than the core. Spacers are used to ensure that the wood core is positioned evenly in the mold. The extra space in the mold is filed with expandable polystyrene beads, or equivalent. One non-limiting example of beads suitable for use in the present invention include expandable polystyrene beads of the formula $[CH[C_6H_5]CH_2]$ and of a molecular weight of 150,000-300,000 daltons, or equivalent. One non-limiting example for a source of the beads suitable for use in the present invention is StyroChem of Quebec, Canada. The mold is baked. Baking can be performed at any temperature and length of time that produces a suitable result. A suitable result is defined herein as producing a hard contiguous or essentially contiguous plastic covering or encasement for the wood core on the present invention. Baking is typically performed at about 350 degrees Fahrenheit for about 30 minutes however, one skilled in the art realizes that times and temperatures can be adjusted and suitable results still be obtained. For example, if the temperature is increased then the bake time can be decreased. Likewise, if the temperature is decreased then the bake time will need to be increased. Thus, it is contemplated that the temperature for baking the device of the present invention can be from about 290 degrees to about 400 degrees Fahrenheit and bake time can be from about 10 minutes to about one hour.

Baking causes the polystyrene beads to expand filing the space between the balsa wood core and the inner surface of the mold. When removed from the mold and cooled, the balsa wood core is encased in a hard, durable and waterproof covering. One practiced in the art will realize that, based on the teachings of this specification, other plastics may be used for encasing the wood core of the planer board of the present invention.

The planer board of the present invention has unexpected benefits over the prior art. The most important benefit is that the planer board of the present invention is lighter than those presently available or known in the art and it does this without giving up the necessary and customary size of the planer board. For example, the planer boards made by the process of the present invention weighs approximately 8.8 ounces whereas planer boards known by those skilled in the art weigh between 9.5 and 10.8 ounces. Thus, the planer board of the present invention is between 7.4 and 18.5 percent lighter than those known by those skilled in the art. This difference in weight permits the user to detect strikes by smaller fish more readily than with the heavier prior art planer boards. Reducing the size of the planer board to create a lighter planer board is typically not acceptable to users since the reduced size can make the board harder to control while trolling and makes it more difficult for the user to see. Additionally, the planer board of the present invention is less fatiguing to reel in because it is lighter.

Since balsa wood, because of its low density, does not hold screws and other attachment devices well (e.g., nails, plugs), inserts may be used to aid in securing these various devices to the planer board. In this regard, for example, the wood core of the present invention is machined to the desired size and specifications before the encasement process. After the wood is machined to the desired size, holes are drilled at the locations of the flag holder, line guidance device, line gripping device, weights, etc. Inserts are then pressed into the drilled holes. The inserts provide, for example, a tapped hole (a tapped hole is a hole with screw threads cut into the wall of the hole) for inserting and tightening a screw. The insert is then secured in place when the wood core is encased in the plastic encasement, as described above. Inserts may traverse the width of the planer board (for example, from the first side to the second side) or may be insert between ¼ to 1¼ inch into the planer board if the inserts are used, for example, at the top or bottom sides or front of back ends of the planer board.

The planer board of the present invention comprises various devices for holding the fishing line, signaling the fisherman of a "bite" or strike or to keep the planer board oriented properly in the water, for example. Some of these devices are referred to as fishing line guidance devices, fishing line gripping devices, weights, flag (or other signaling device) holders, etc. These devices will be discussed in greater detail below.

The planer board of the present invention also comprises device for retaining the fishing line. For example, the planer board may comprise a device for gripping the fishing line and another device for guiding the fishing line. In the context of the present invention, these devices are quick release devices that enable the user to release the fishing line quickly when, for example, they are reeling in a fish. When reeling in a fish, the planer board must be removed so that the fishing line can continue to be reeled in and thereby bring the fish close enough to the boat so that is can be netted and brought into the boat.

The planer board of the present invention is not limited by the design or mode of operation of the gripping device of the gripping device of the present invention. Numerous types of gripping devices are known in the art. However, a preferred gripping device comprises two fingered grippers that are designed to stay closed on the fishing line. They are opened by pressing on levers connected to the fingered portions of the grippers. The fingered portions of the grippers are designed such that the fingers intermesh with each other when the device is closed. Illustrations of the fingered gripping device of the present invention are presented in FIG. 2 (closed) and FIG. 3 (opened). A spring, for example, is used to keep the gripping device in the closed position.

In another embodiment, the user of the planer board of the present invention may, for example, wrap the fishing line around one of the fingered grippers of the present invention when placing the fishing line into the gripping device of the present invention.

The planer board of the present invention is not limited by the design or mode of operation of the guidance device of the present invention. A guidance device serves to guide the fishing line without gripping the line. The guidance device is usually located at the back end of the planer board and helps to ensure that the fishing line trails the planer board thereby helping to keep the line from tangling with other lines. Numerous types of guidance devices are known in the art. However, in a preferred embodiment, the guidance device of the present invention comprises an essentially circular device that is held in place on the back end of the planer board with a spring loaded mechanism. The device also comprises one or two slits wherein the fishing line can be placed. The slits have an opening or slot for slipping the fishing line in to the slits. The device is designed such that the fishing line cannot be removed from the slits (other than pulling the length of the fishing line through the slits lengthwise) when the slits are closed. The guidance device is opened by pulling the device from the back of the planer board and rotating it about 90 degrees. The guidance device can then rest on tabs that hold it away from the back end of the planer board. When closed, the tabs keep the guidance device from opening by locking the guidance device in place by keeping the circular guidance device from turning. See, for example, FIGS. 3A-C.

The planer board of the present invention may also comprises other features. For example, in one embodiment, the planer board of the present invention also comprises one or more weights attached to the bottom edge of the planer board to help the board remain upright in, for example, rough or choppy water. The weight may be interchangeable so the user can choose the correct weight for the fish and/or water conditions.

The planer board of the present invention may also comprise a signaling device to alert the user that they have a strike or bite. In one embodiment, the signaling device is a flag mounted on the top edge of the planer board. In another embodiment, the signaling device is a light stick or other illuminated device that is visible in low light conditions or at night.

In a preferred embodiment, the planer board of the present invention, contemplates: an essentially flat rectangular body having a first side and a second side, a front end and a back end and a top edge and a bottom edge, wherein the front end is tapered from the front end to about one-forth to one-half of the length of the planer board body on the first side; said body comprising a balsa wood core encased in polystyrene plastic, said polystyrene plastic casing produced by placing the balsa wood core in a mold, surrounding the balsa wood core with polystyrene beads and baking until the polystyrene beads expand thereby essentially filling any spaces between the beads and fusing the beads together; a quick release line gripping device extending from the first side, said quick release gripping device comprising first and second fingered grips, each of said first and second fingered grips having i) a fingered portion, ii) a lever portion comprising proximal and distal ends and iii) a connecting portion comprising proximal and distal ends, wherein the proximal ends of said lever portions of said first and second fingered grips are pivotally attached to each other and said lever portions are held apart by a spring positioned between the lever portions of the first and second fingered grips, the distal ends of said first and second lever portions attached to said proximal ends of said connecting portions, the connecting portions of said first and second fingered grips angled such that the connecting portions cross each other, the distal ends of the connecting portions attached to the fingered portion of said first and second fingered grips with fingers of the first fingered grip oriented to extend towards the fingers of the second fingered grip and such that the fingers of the first and second fingered grips intermesh with each other, such that when the lever portions of the first and second fingered grips are pushed towards each other, the spring compresses and the fingered portions of said first and second fingered grips separate from each other and when the lever portions of the first and second fingered grips are released the fingered portions intermesh with each other; an essentially circular quick release line guidance device mounted on the back end of the planer board, said essentially circular quick release line guidance device comprising a spring mounted circular device having a side facing the back end of the planer board body and a side facing away from the planer board body, said circular device additionally comprising two tabs that protrude from the side facing the planer board and extending over the first and second side of the planer board when said circular device is positioned flush against the end of the planer board, the spring of said spring mounted circular device capable of keeping the circular device pulled towards the back end of the planer board body wherein the circular device is in a closed position when the circular device is flush with the beck end of the planer board body and in an opened position when the circular device is pulled from the back end of the planer board body, rotated about 90 degrees and positioned such that the tabs rest on the back end of the planer board body, holding the circular device off of the back end of the back end of the planer board body, said circular device also comprising at least one slit, said slit essentially shaped like an arch and positioned such that the slit is opened when the circular device is in the opened position allowing a fishing line to be positioned into the slit and such that the slit is closed when the circular device is in the closed position preventing the fishing line from leaving the slit by the slit opening or slot, and, optionally, a signal device.

Other features and advantages of the invention will be apparent from the following description.

DETAILED DESCRIPTION OF PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1:
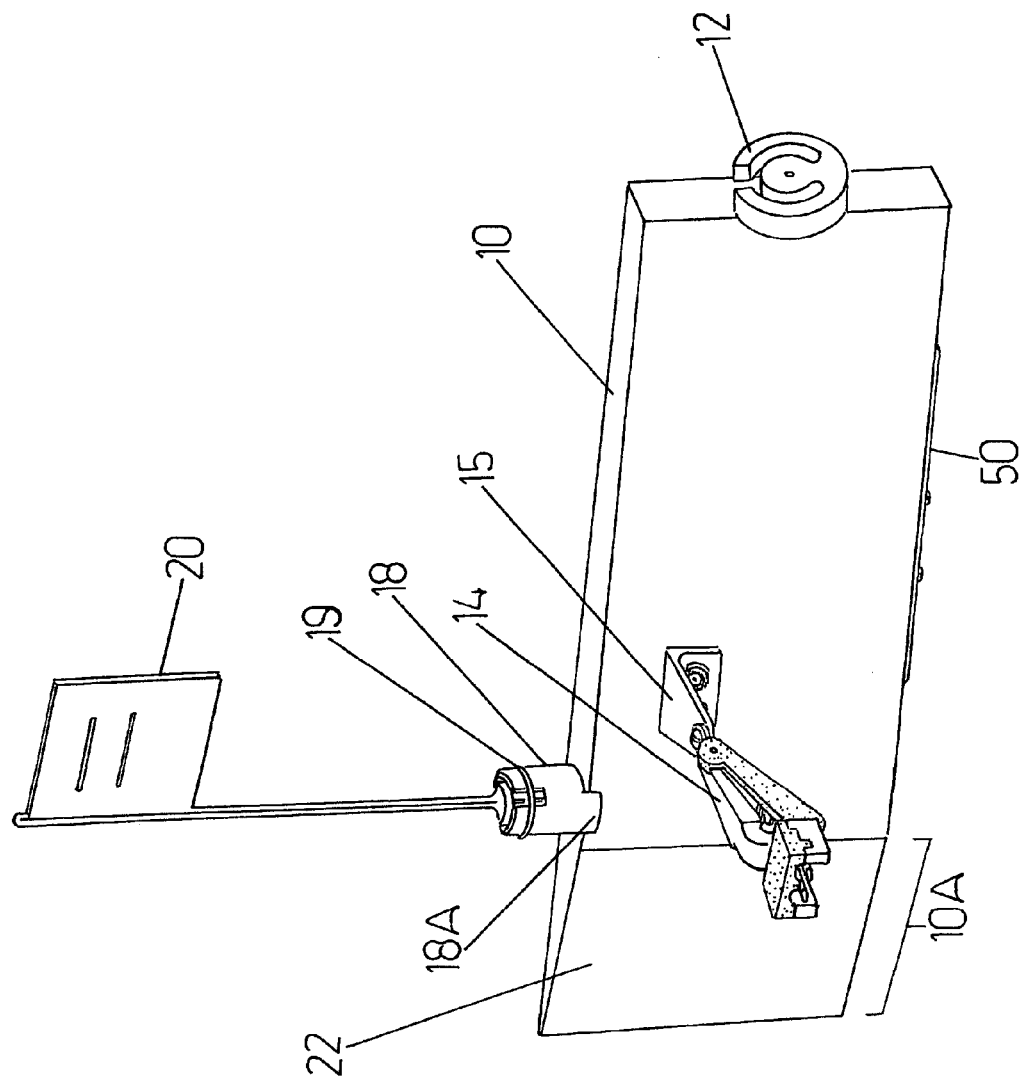
FIG. 1 shows a ¾ view of one embodiment of the planer board of the present invention.

FIG. 1 shows a ¾ view of one embodiment of the planer board of the present invention. The planer board 10 is viewed from the first side. The tapered front end portion of the first side 10A is visible. Here, the taper comprises about ¼ of the length of the planer board but it may, in other embodiments, comprise up to about ½ the length of the planer board. The taper serves to reduced resistance of the planer board as it is being pulled by the boat through the water. One practiced in the art can determine the portion of the first side that is best suited for tapering based on the use of the planer board (e.g., size of board, speed of boat, etc.). In a preferred embodiment, the taper comprises about ½ to ⅓ the length of the planer board.

Also shown in FIG. 1 is one embodiment of the gripping device of the present invention 14 and an optional extension piece 15 for holding the gripping device further from the first side of the planer board and to help secure the gripping device to the planer board. Visible also is one embodiment of the guidance device of the present invention 12, counter weights 50, a base unit 18 for securing a signaling device. In this embodiment, the signaling device is a flag 20. The flag is secured in the base with an "O"-ring 19. The base unit also has, in this embodiment, alignment tabs 18A.

Figure 2:
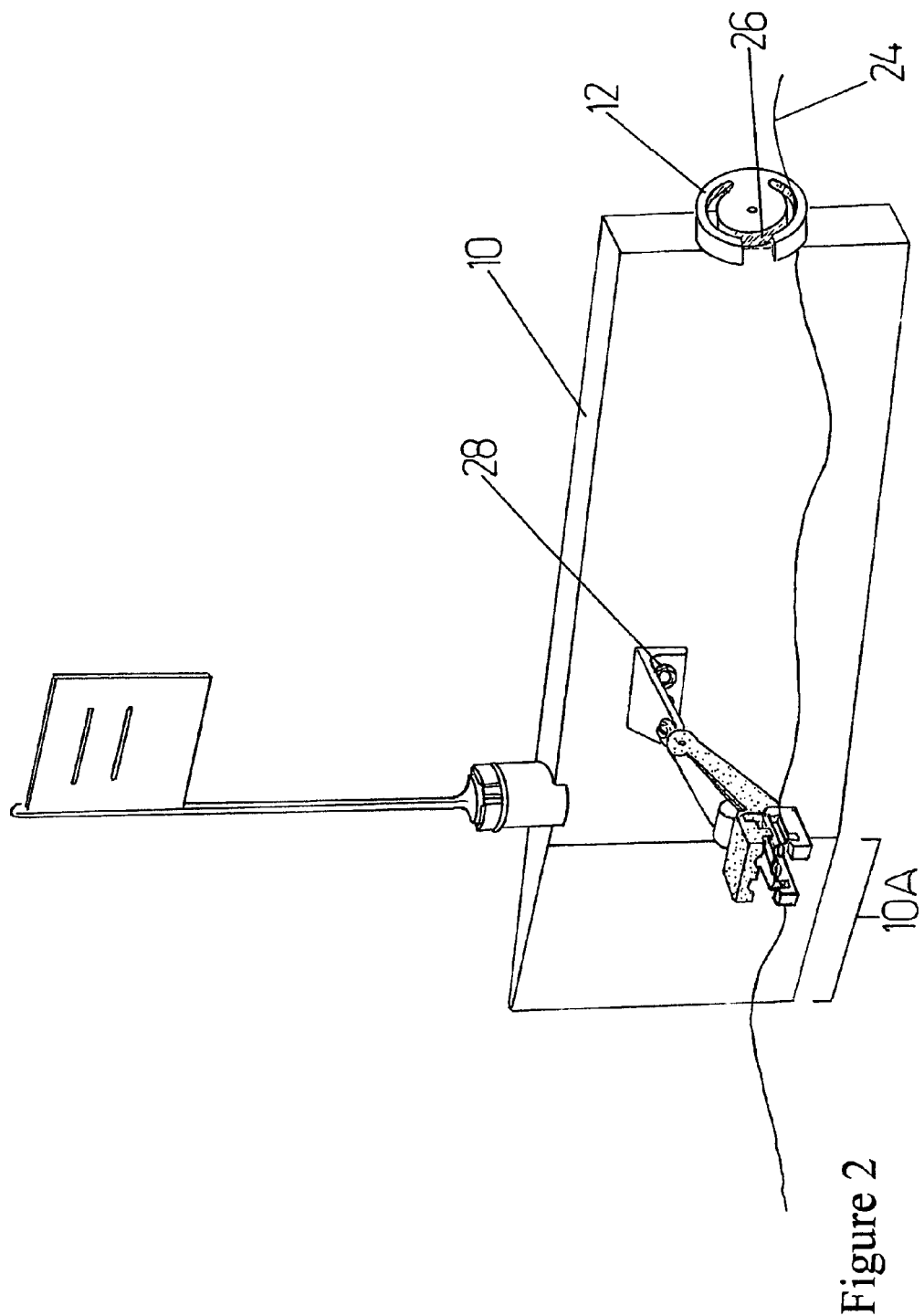
FIG. 2 shows a ¾ view of one embodiment of the planer board of the present invention with the gripping device and the guidance device in the open positions.

FIG. 2 shows one embodiment of the planer board of the present invention wherein the gripping (unnumbered in this figure) and guidance 12 devices are in the open positions. Also shown is how the fishing line 24 is fed into the guidance device of the present invention through opening or slot 26 and how it is fed through the gripping device. In another embodiment, the fishing line may be wrapped around the jaws of the gripping device one or more times such that the fishing line passes through the jaws or fingers of the gripping device more than one time. Screws and nuts 28 secure the gripping device and/or extension piece to the planer board of the present invention.

Figure 3A:
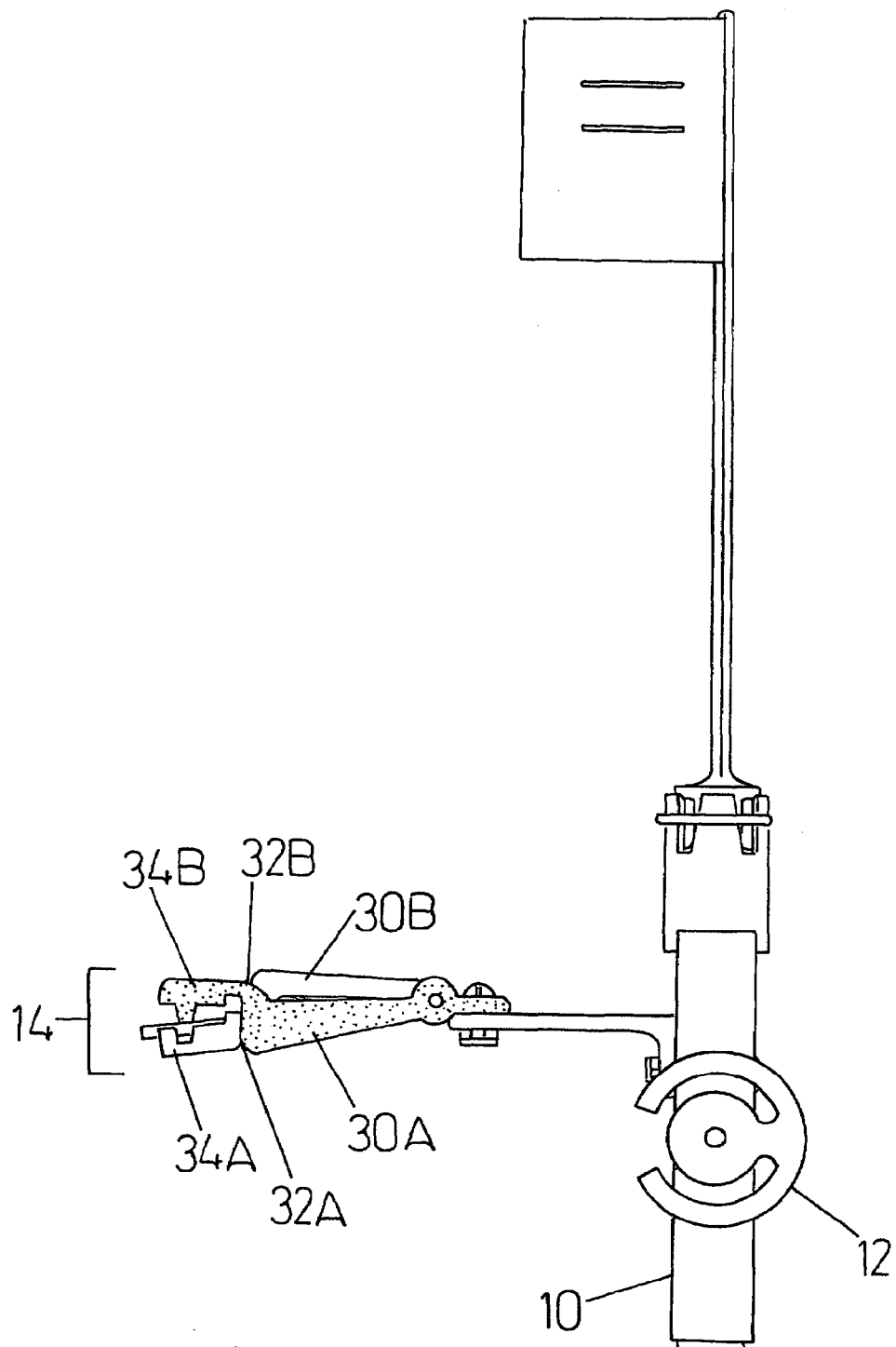
FIG. 3A-C show A) a side view of one embodiment of the circular guidance device of the present invention in the open position, B) a top view of one embodiment of the circular guidance device of the present invention in the open position and, C) a side view of one embodiment of the gripping device of the present invention in the open position.

FIG. 3A shows an end view of one embodiment of the planer board 10 of the present invention. Guidance device 12 is in the open position. Gripping device 14 is in the closed position. The Figure also notes several parts of the gripping device 14. The gripping device, in this embodiment, is made of two fingered grips (denoted as A and B in the figure). The first fingered grip comprises a lever portion 30A, a connector portion 32A and a fingered portion 34A. The lever portion and connecting portions have proximal and distal ends with the proximal ends being defined as the ends closest to the planer board and the distal ends being the ends furthest from the planer board. As can be seen in the Figure, the distal end of the lever portion of the fingered grip is connected to the proximal end of the connector portion of the fingered grip. The fingered portion of the fingered grip is connected to the distal end of the connector portion.

The second fingered grip is similarly arranged and constructed with the distal end of the lever portion 30B connecting to the proximal end of the connector portion 32B and the distal end of the connector portion connecting the fingered portion 34B. When closed, as shown in the figure, the "fingers" of the first fingered grip intermesh with indentations of the second fingered grip and the fingers of the second fingered grip intermesh with indentations of the first fingered grip. The invention is not limited by the orientation of the fingers in relation to the orientation of the planer board. For example, the fingers may be either parallel, perpendicular or at an angle to the height (top, signal device side to bottom, counter weight side) of the planer board. In the figure the fingers of the first fingered grip are arranged parallel to the height of the planer board and the fingers of the second fingered grip are arranged perpendicular to the height of the planer board.

The first and second fingered grips are pivotally attached to each other at the proximal ends of the first and second lever portions.

Figure 3B:
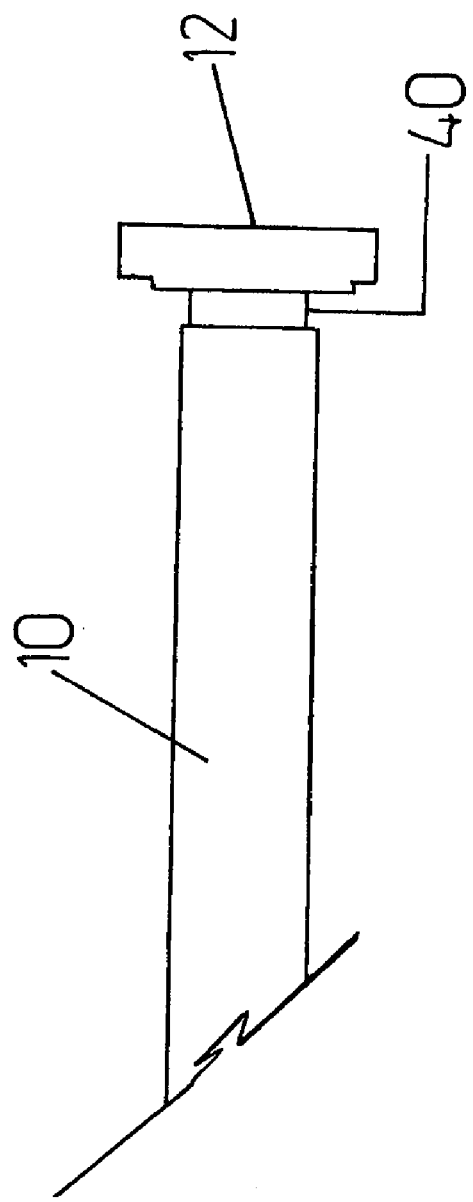

FIG. 3B shows one embodiment of the guidance device of the present invention from a top view. The guidance device 12 is located at the back end of the planer board 10. The guidance device is shown in the open position and the tabs 40 of the guidance device are resting on the back end of the planer board holding the planer guidance device off of the planer board. This position allows for the user to easily thread the fishing line through the guidance device or remove the fishing line form the guidance device.

Figure 3C:
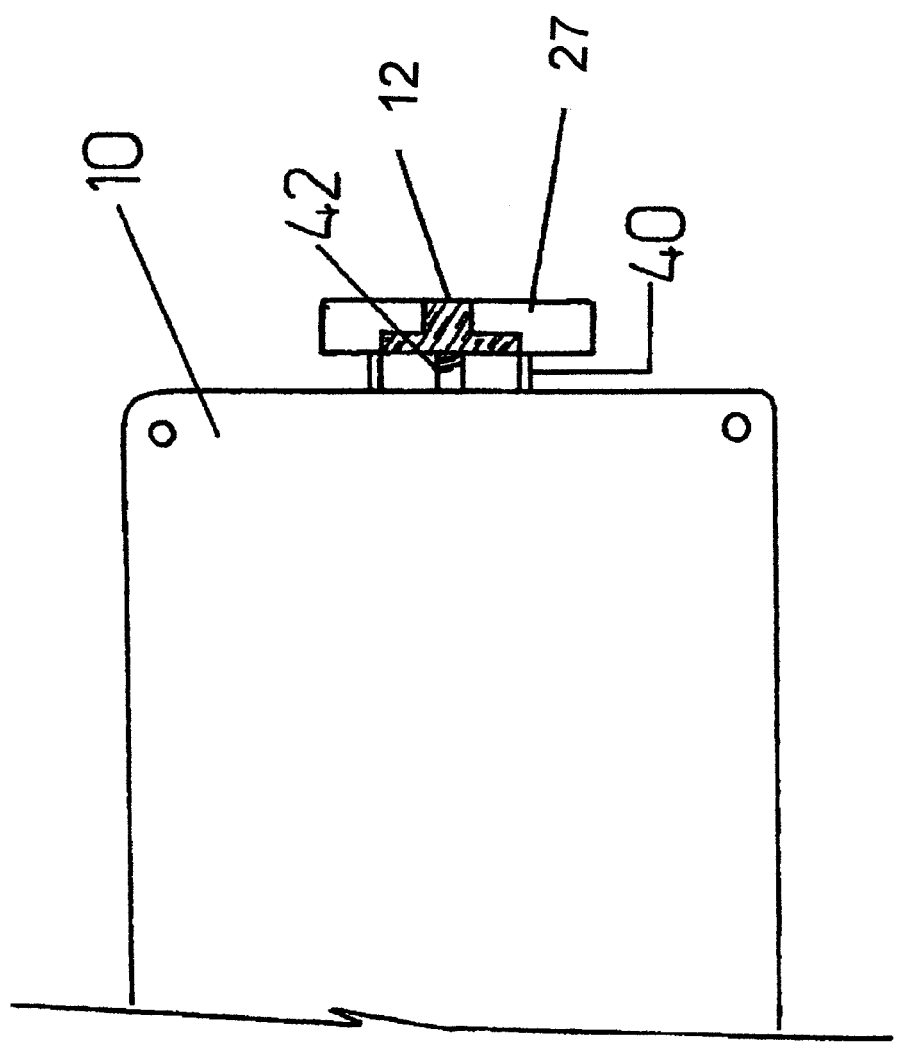

FIG. 3C shows one embodiment of the guidance present from a side view. The guidance device 12 is located at the back end of the planer board 10. The guidance device is shown in the open position and the tabs 40 of the guidance device are resting on the back end of the planer board holding the planer guidance device off of the planer board. This position allows for the user to easily thread the fishing line through the guidance device or remove the fishing line from the guidance device. Also shown is the spring device 42 used to secure the guidance device against the back end of the planer board. In this embodiment, pulling the guidance device of from the back end the planer board compresses the spring (or extends it depending on the design used) comprising the spring loaded device 42. The device can then be turned about 90 degrees so that the tab(s) 40 can rest on the back end of the planer board. The spring then pulls the device to the back of the planer board holding the guidance device in the open position so that fishing line can be easily threaded into or out of the slot 26 on the planer board. Pulling on the guidance device and rotating it 90 degrees will close the guidance device so that the fishing line can not be inadvertently removed from the guidance device. In this position, the tabs 40 are positioned on either side of the planer board, preventing it from rotating open inadvertently, and the guidance device rests directly on the back end of the planer board.

Figure 4:
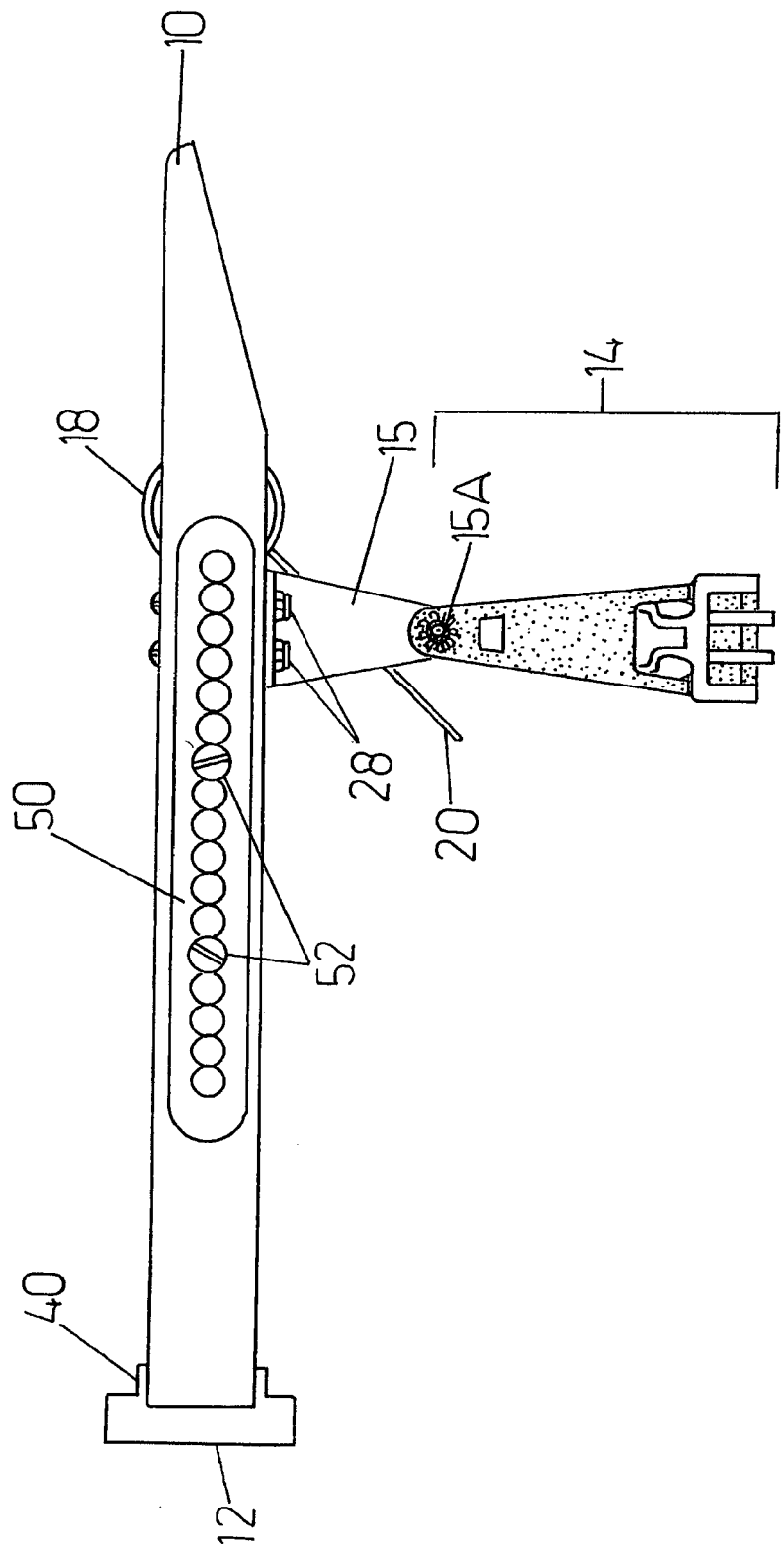
FIG. 4 shows one embodiment of a bottom view of the planer board of the present invention.

FIG. 4 shows one embodiment of a bottom view of the planer board 10 of the present invention. Shown are the gripping device 14, the extension piece 15, a means for securing the gripping device to the extension piece 15A (a screw and nut, for example), a means for holding the extension piece to the planer board 28 (one or more screws and nuts, for example), the counter weight 50, screws 52, for example, to hold the counter weight to the planer board, the guidance device 12, the tabs of the guidance device 40, the base unit for holding the signaling device 18 and the flag 20.

Figure 5:
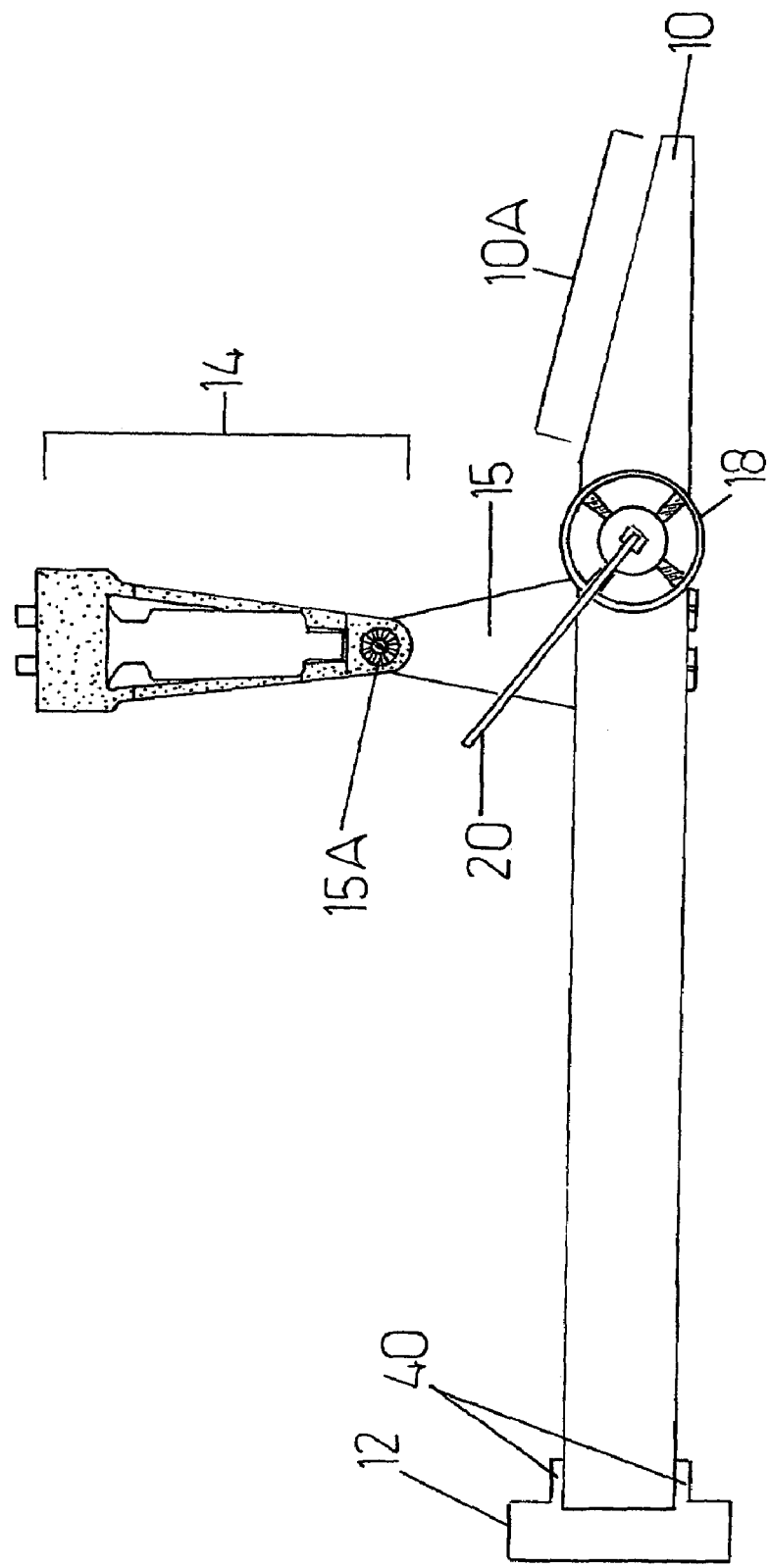
FIG. 5 shows one embodiment of a top view of the planer board of the present invention.

FIG. 5 shows one embodiment of the top view of the planer board 10 of the present invention including the tapered portion 10A. Shown are the gripping device 14, the extension piece 15, a means for securing the gripping device to the extension piece 15A (a screw and nut, for example), the guidance device 12, the tabs of the guidance device 40, the base unit for holding the signaling device 18 and the flag 20.

Figure 6:
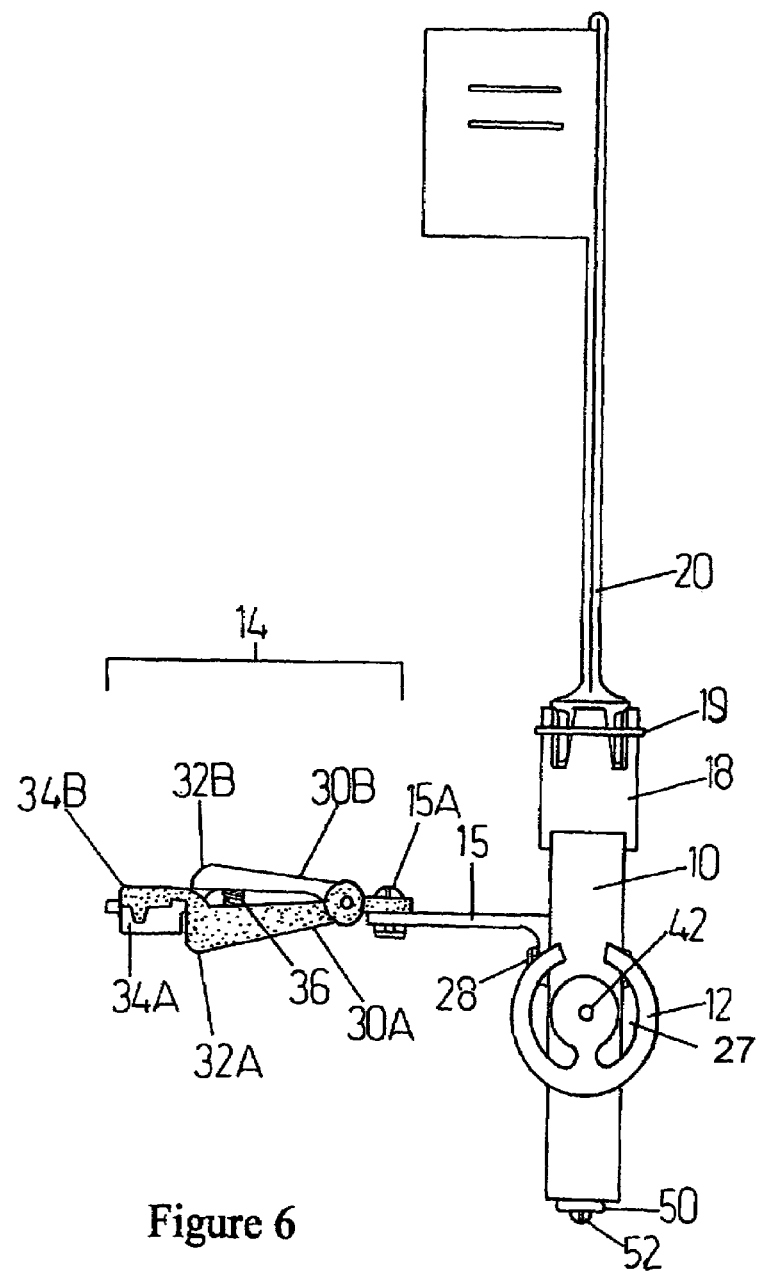
FIG. 6 shows one embodiment of shows one embodiment of an end view of the planer board of the present invention.

FIG. 6 shows an end view of one embodiment of the planer board 10 of the present invention. Guidance device 12 is in the closed position. Also shown are slits 27 and the location of the spring device 42 of the guidance device. The one or more slits 27 are essentially shaped like an arch and positioned such that the slits 27 are opened when the guidance device 12 is in the opened position allowing a fishing line to be positioned into the slits 27 and such that the slits 27 are closed when the guidance device 12 is in the closed position preventing the fishing line from leaving the slits 27 by the slit opening or slot 26. Gripping device 14 is in the closed position. The Figure also notes several parts of the gripping device 14. The gripping device, in this embodiment, is made of two fingered grips (denoted as A and B in the figure). The first fingered grip comprises a lever portion 30A, a connector portion 32A and a fingered portion 34A. The lever portion and connecting portions have proximal and distal ends with the proximal ends being defined as the ends closest to the planer board and the distal ends being the ends furthest from the planer board. As can be seen in the Figure, the distal end of the lever portion of the fingered grip is connected to the proximal end of the connector portion of the fingered grip. The fingered portion of the fingered grip is connected to the distal end of the connector portion.

The second fingered grip is similarly arranged and constructed with the distal end of the lever portion 30B connecting to the proximal end of the connector portion 32B and the distal end of the connector portion connecting the fingered portion 34B. When closed, as shown in the figure, the "fingers" of the first fingered grip intermesh with indentations of the second fingered grip and the fingers of the second fingered grip intermesh with indentations of the first fingered grip. The invention is not limited by the orientation of the fingers in relation to the orientation of the planer board. For example, the fingers may be either parallel, perpendicular or at an angle to the height (top, signal device side to bottom, counter weight side) of the planer board. In the figure the fingers of the first fingered grip are arranged parallel to the height of the planer board and the fingers of the second fingered grip are arranged perpendicular to the height of the planer board. The first and second fingered grips are pivotally attached to each other at the proximal ends of the first and second lever portions.

Shown in this figure also is spring 36 located between the first and second lever portions of the first and second fingered grips of the present invention which helps keep the gripping device closed, the counter weight(s) 50, screws or other means for securing the counter weights to the planer board 52, the extension device 15 with means for securing the griping device to the extension device 15A, the means for securing the extension device to the planer board 28, the base unit 18, signaling device (e.g., a flag glow stick or powered light) 20 and "O"-ring 19.

Figure 7:
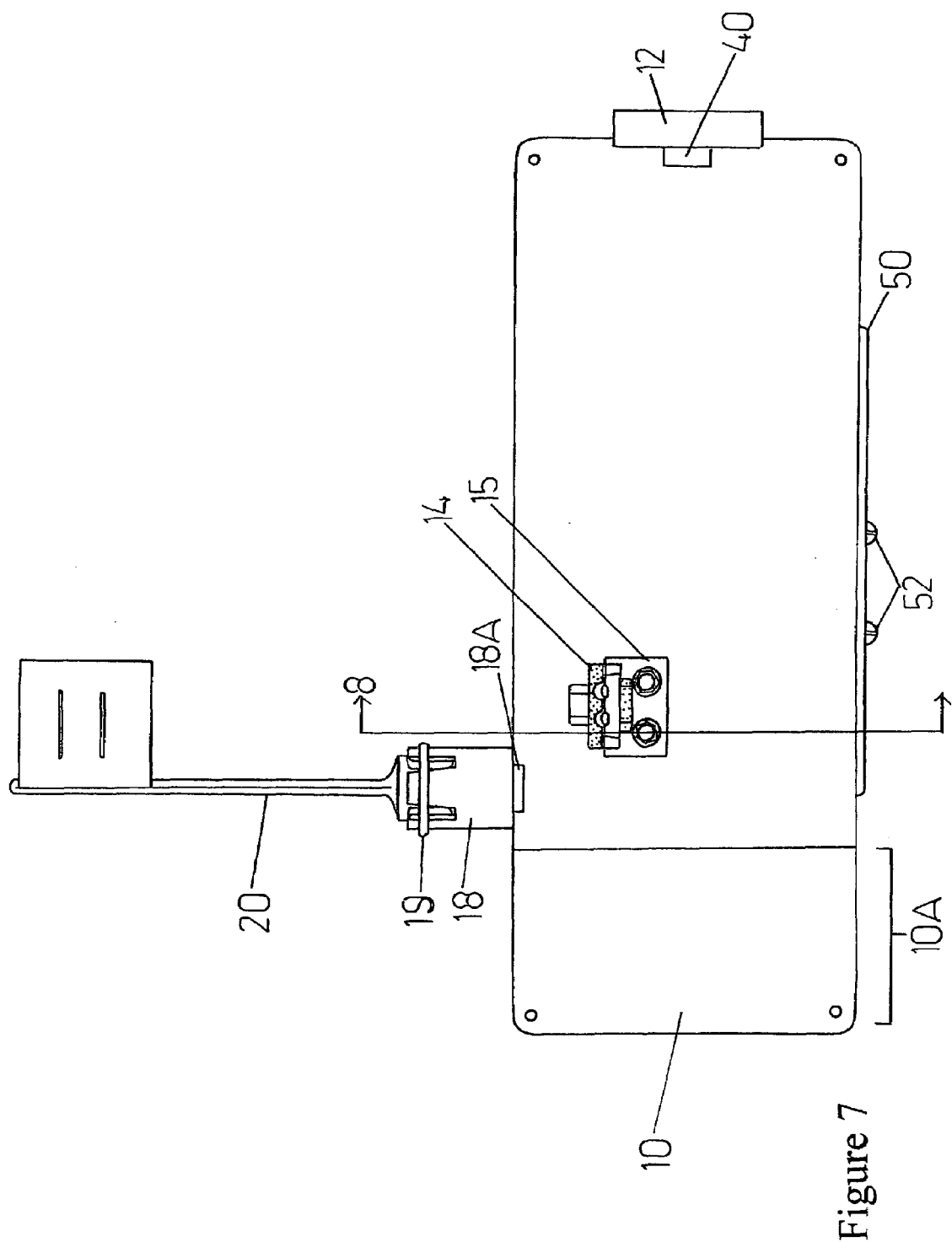
FIG. 7 shows one embodiment of a side view of the planer board of the present invention.

FIG. 7 shows one embodiment of a side view of the first side of the planer board 10 of the present invention including the tapered portion 10A of the planer board. Also shown are the Griping device 14, extension device 15 guidance device 12 with tabs 40, counter weights 50 with securing means 52, base unit 18 with tabs 18A signaling device 20 and "O"-ring 19.

Figure 8:
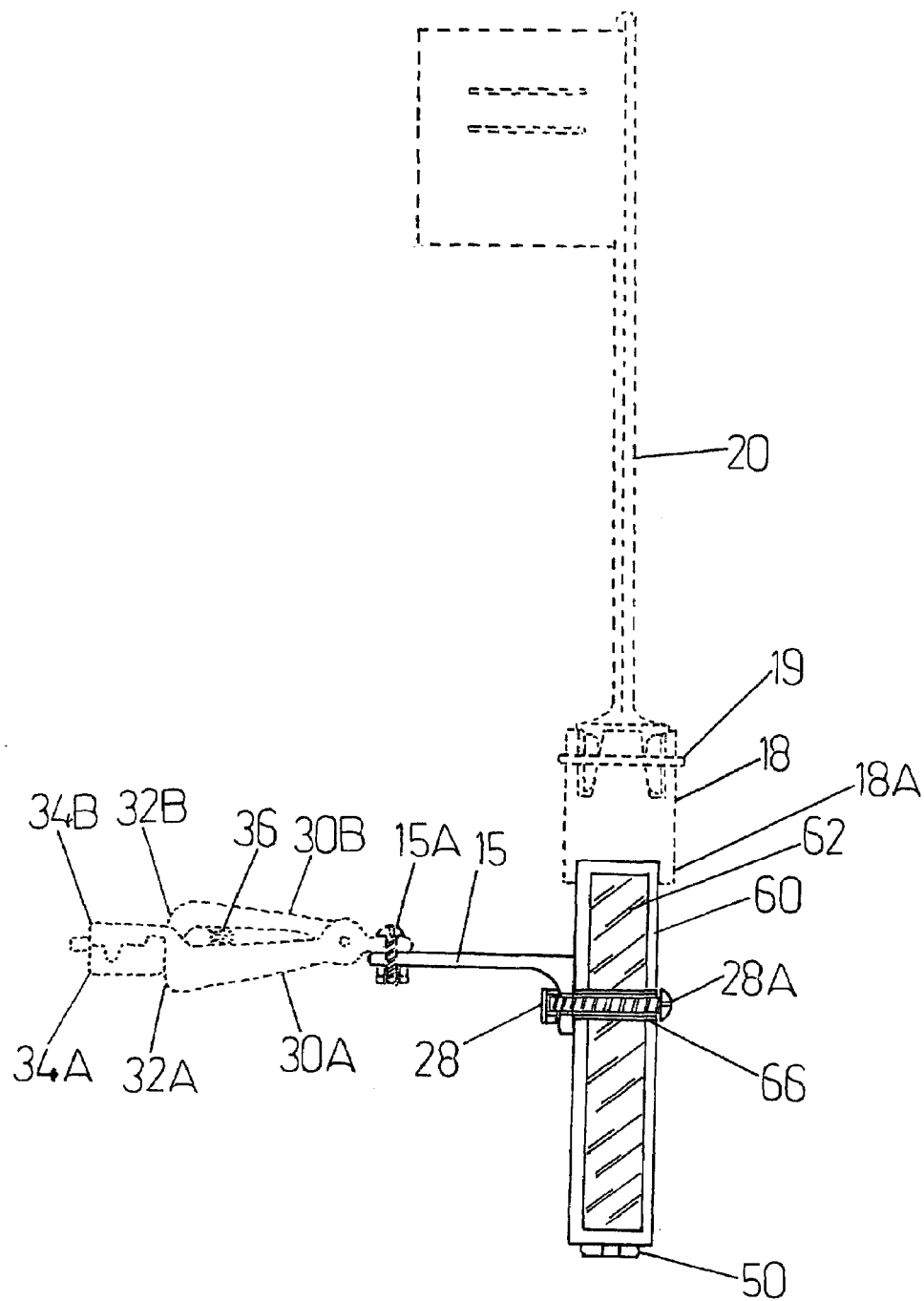
FIG. 8 shows one embodiment of a cross section of the planer board of the present invention.

FIG. 8 shows one embodiment of a cross section of the planer board 10 of the present invention. The cross section shows the wood core of the planer board 62 and plastic encasement 60. Also shown is an insert 66 for holding, for example, a screw 28A in the wood core. The screw is secure with a nut 28. In another embodiment, the inserts need not go completely through the planer board. For example, inserts used for securing the guidance device need only go into the wood core far enough to ensure that they are firmly in place and will not loosen with normal use. In one embodiment the inserts that do not traverse the planer board are inserted between ¼ to 1¼ inch into the planer board.

What is claimed is:

1. A planer board, comprising:
  a. an essentially flat rectangular body having a first side and a second side, a front end and a back end and a top edge and a bottom edge, wherein the front end is tapered from the front end to about one-fourth to one-half of a length of the planer board body on the first side;
  b. said body comprising a wood core encased in plastic;
  c. a quick release line gripping device extending from the first side, said quick release gripping device effective for reversibly gripping a fishing line;
  d. a quick release line guidance device mounted on the back end of the planer board, said quick release line guidance device effective for guiding a fishing line without gripping said fishing line, wherein said quick release line guidance device comprises a spring mounted circular device having a side facing the back end of the planer board body and a side facing away from the planer board body, said circular device additionally comprising two tabs that extend both from the side facing the back end of the planer board body and over the first and second sides of the planer board body when said circular device is positioned flush against the back end of the planer board body, a spring of said spring mounted circular device capable of keeping the circular device pulled towards the back end of the planer board body wherein the circular device is in a closed position when the circular device is flush with the back end of the planer board body and in an opened position when the circular device is pulled from the back end of the planer board body, rotated about 90 degrees and positioned such that the tabs rest on the back end of the planer board body, said circular device also comprising at least one slit, said at least one slit essentially shaped like an arch and positioned such that the at least one slit is opened when the circular device is in the opened position allowing a fishing line to be positioned into the at least one slit and such that the at least one slit is closed when the circular device is in the closed position preventing the fishing line from leaving the at least one slit by a slit opening.

2. The planer board of claim 1, wherein said quick release gripping device extending from the first side comprises first and second fingered grips, each of said first and second fingered grips having i) a fingered portion, ii) a lever portion comprising proximal and distal ends, and iii) a connecting portion comprising proximal and distal ends, wherein the proximal ends of said lever portions of said first and second fingered grips are pivotally attached to each other and said lever portions are held apart by a spring positioned between the lever portions of the first and second fingered grips, the distal ends of said first and second lever portions attached to said proximal ends of said connecting portions, the connecting portions of said first and second fingered grips being angled resulting in the connecting portions crossing each other, the distal ends of the connecting portions attached to the fingered portions of said first and second fingered grips with fingers of the first fingered grip oriented to extend towards fingers of the second fingered grip such that the fingers of the first and second fingered grips intermesh with each other and such that when the lever portions of the first and second fingered grips are pushed towards each other, the spring compresses and the fingered portions of said first and second fingered grips separate from each other and when the lever portions of the first and second fingered grips are released the fingered portions of said first and second fingered grips intermesh with each other.

3. The planer board of claim 1, wherein said planer board additionally comprises a signal device.

4. The planer board of claim 1, wherein said body comprises a balsa wood core encased in polystyrene plastic, said balsa wood core encased in polystyrene plastic produced by placing the balsa wood core in a mold, surrounding the balsa wood core with polystyrene beads and baking until the polystyrene beads expand thereby essentially filling any spaces between the beads and fusing the beads together.

5. The planer board of claim 1, wherein said plastic comprises polystyrene.

6. The planer board of claim 1, wherein said polystyrene comprises expandable polystyrene beads.

7. The planer board of claim 1, wherein said wood core comprises balsa wood.

8. A planer board, comprising:
  a. an essentially flat rectangular body having a first side and a second side, a front end and a back end and a top edge and a bottom edge, wherein the front end is tapered from the front end to about one-fourth to one-half of a length of the planer board body on the first side;

b. said body comprising a wooden core encased in plastic;

c. a quick release line gripping device extending from the first side, said quick release gripping device effective for reversibly gripping a fishing line;

d. an essentially circular quick release line guidance device mounted on the back end of the planer board, said essentially circular quick release line guidance device comprising a spring mounted circular device having a side facing the back end of the planer board body and a side facing away from the planer board body, said circular device additionally comprising two tabs that both protrude from the side facing the back end of the planer board body and extend over the first and second sides of the planer board body when said circular device is positioned flush against the back end of the planer board body, a spring of said spring mounted circular device capable of keeping the circular device pulled towards the back end of the planer board body wherein the circular device is in a closed position when the circular device is flush with the back end of the planer board body and in an opened position when the circular device is pulled from the back end of the planer board body, rotated about 90 degrees and positioned such that the tabs rest on the back end of the planer board body, holding the circular device off of the back end of the planer board body, said circular device also comprising at least one slit, said at least one slit essentially shaped like an arch and positioned such that the at least one slit is opened when the circular device is in the opened position allowing a fishing liner to be positioned into the at least one slit and such that the at least one slit is closed when the circular device is in the closed position preventing the fishing line from leaving the at least one slit by a slit opening.

9. The planer board of claim 8, wherein said plastic comprises polystyrene.

10. The planer board of claim 9, wherein said polystyrene comprises expandable polystyrene beads.

11. The planer board of claim 8, wherein said wood core comprises balsa wood.

12. The planer board of claim 11, wherein said body is produced by placing the balsa wood core in a mold, surrounding the wood core with polystyrene beads and baking until the polystyrene beads expand thereby essentially filling any spaces between the beads and fusing the beads together.

13. The planer board of claim 8, wherein said planer board additionally comprises a signal device.

14. A planer board, comprising:

a. an essentially flat rectangular body having a first side and a second side, a front end and a back end and a top edge and a bottom edge, wherein the front end is tapered from the front end to about one-fourth to one-half of a length of the planer board body on the first side;

b. said body comprising a balsa wood core encased in polystyrene plastic, said balsa wood core encased in polystyrene plastic produced by placing the balsa wood core in a mold, surrounding the balsa wood core with polystyrene beads and baking until the polystyrene beads expand thereby essentially filling any spaces between the beads and fusing the beads together;

c. a quick release gripping device extending from the first side, said quick release gripping device comprising first and second fingered grips, each of said first and second fingered grips having i) a fingered portion, ii) a lever portion comprising proximal and distal ends, and iii) a connecting portion comprising proximal and distal ends, wherein the proximal ends of said lever portions of said first and second fingered grips are pivotally attached to each other and said lever portions are held apart by a spring positioned between the lever portions of the first and second fingered grips, the distal ends of said first and second lever portions attached to said proximal ends of said connecting portions, the connecting portions of said first and second fingered grips being angled such that the connecting portions cross each other, the distal ends of the connecting portions attached to the fingered portion of said first and second fingered grips with fingers of the first fingered grip oriented to extend towards fingers of the second fingered grip and such that the fingers of the first and second fingered grips intermesh with each other, such that when the lever portions of the first and second fingered grips are pushed towards each other, the spring compresses and the fingered portions of said first and second fingered grips separate from each other and when the lever portions of the first and second fingered grips are released the fingered portions intermesh with each other;

d. an essentially circular quick release line guidance device mounted on the back end of the planer board body, said essentially circular quick release line guidance device comprising a spring mounted circular device having a side facing the back end of the planer board body and a side facing away from the planer board body, said circular device additionally comprising two tabs that both protrude from the side facing the planer board and extend over the first and second sides of the planer board body when said circular device is positioned flush against the back end of the planer board body, a spring of said spring mounted circular device capable of keeping the circular device pulled towards the back end of the planer board body wherein the circular device is in a closed position when the circular device is flush with the back end of the planer board body and in an opened position when the circular device is pulled from the back end of the planer board body, rotated about 90 degrees and positioned such that the tabs rest on the back end of the planer board body, holding the circular device off of the back end of the planer board body, said circular device also comprising at least one slit, said at least one slit essentially shaped like an arch and positioned such that the at least one slit is opened when the circular device is in the opened position allowing a fishing line to be positioned into the at least one slit and such that the at least one slit is closed when the circular device is in the closed position preventing the fishing line from leaving the at least one slit by a slit opening.

15. The planer board of claim 14, wherein said planer board additionally comprises a signal device.

* * * * *